United States Patent [19]

Bottinick et al.

[11] Patent Number: 4,960,293

[45] Date of Patent: Oct. 2, 1990

[54] ANIMAL SHIELD

[76] Inventors: Martin Bottinick; Miriam Bottinick, both of 9106 Wagtail Dr., Austin, Tex. 78748

[21] Appl. No.: 346,595

[22] Filed: May 2, 1989

[51] Int. Cl.[5] ................................................ B60R 21/06

[52] U.S. Cl. ........................................ 280/749; 119/96

[58] Field of Search ......................... 280/749; 410/127; 119/96

[56] References Cited

U.S. PATENT DOCUMENTS

| | | | |
|---|---|---|---|
| 3,169,781 | 2/1965 | Abruzzino | 280/749 |
| 4,213,636 | 7/1980 | King | 280/749 |
| 4,512,286 | 4/1985 | Rux | 119/96 |
| 4,715,618 | 12/1987 | Harris | 119/96 |
| 4,770,127 | 9/1988 | Volk | 119/96 |

FOREIGN PATENT DOCUMENTS

| | | | |
|---|---|---|---|
| 288386 | 10/1988 | European Pat. Off. | 280/749 |
| 1933763 | 1/1971 | Fed. Rep. of Germany | 280/749 |
| 2448527 | 4/1976 | Fed. Rep. of Germany | 280/749 |
| 2598366 | 11/1987 | France | 280/749 |

*Primary Examiner*—Richard A. Bertsch
*Attorney, Agent, or Firm*—Leon Gilden

[57] ABSTRACT

An animal shield is set forth for particular use in combination in clamping engagement with a plurality of spaced bucket seats, as typically found in contemporary automotive construction. The shield includes a downwardly tapering planar transparent shield including an overlying pair of slots with padded spring biased clamps slidingly arranged therein with an underlying pair of slots spaced inwardly of the overlying slots and including a further pair of padded clamps therein for clamping of opposed sides of the bucket seats and affording protection and comfort to an individual positioned within one of the seats.

2 Claims, 4 Drawing Sheets

ANIMAL SHIELD

BACKGROUND OF THE INVENTION

1. Field of the Invention

The field of invention relates to pet guards, and more particularly pertains to a new and improved animal shield wherein the same may be selectively secured in an engaging relationship between opposed pairs of aligned bucket seats within an automotive environment.

2. Description of the Prior Art

The use of various animal restraints and the like have been well known in the prior art. Heretofore, however, the prior art has utilized apparatus to secure an animal in conjunction with tether straps or cage-like arrangements to maintain an animal in a desired orientation within an automobile. The prior art, however, is limiting of animal movement, and on extended trips in an automobile, the associated animal is somewhat fatigued by the use of such apparatus. Example of a prior art device is set forth in U.S. Pat. No. 4,324,204 to Friedman utilizing a plurality of spaced straps overlying a seat with a harness arrangement secured to an animal to enable the animal to enjoy limited vertical freedom in relationship to the seat, but as typical of the prior art, does not allow the animal movement within an associated area as does the instant invention.

U.S. Pat. No. 4,498,425 to Aanestad sets forth an animal restraint utilizing a cage-like arrangement with a forwardly positioned noose to maintain the animal in a particular orientation relative to the cage. The device is of interest relative to the use of an animal restraint organization.

U.S. Pat. No. 4,512,286 to Rux sets forth an animal restraint wherein a container is mounted on the seat of an associated vehicle utilizing a harness and a leash-like arrangement to secure the animal relative to the container.

U.S. Pat. No. 4,715,618 to Harris sets forth a harness for restraining animals wherein the harness is secured to an overlapping belt arrangement to secure the animal to a seat and limit movement of the animal relative to the seat.

U.S. Pat. No. 4,770,127 to Volk is illustrative of a typical cage-like arrangement for restraint of an animal with various doors and openings arranged therein to provide access to the cage and limit movement therewithin.

As such, it may be appreciated that there is a continuing need for a new and improved animal shield wherein the same addresses both the problems of ease of use and effectiveness in construction to enable animal freedom within a rear portion of an automotive compartment, and in this respect, the present invention substantially fulfills this need.

SUMMARY OF THE INVENTION

In view of the foregoing disadvantages inherent in the known types of animal restraints utilized in automotive environments now present in the prior art, the present invention provides an animal shield wherein the same maintains an animal within a rear compartment of an associated automobile without undue restraint of the animal's movements. As such, the general purpose of the present invention, which will be described subsequently in greater detail, is to provide a new and improved animal shield which has all the advantages of the prior art animal restraints and none of the disadvantages.

To attain this, the present invention comprises a planar flexible transparent shield formed of memory retentent polymeric material tapering downwardly to a lowermost edge with a recess formed within the lowermost edge for reception of a transmission tunnel of an automobile. The shield is provided with a pair of upper aligned slots to receive "C" clamps formed with integral spring biased legs to clamp forward and rear surfaces of spaced bucket seats of an automobile. The slots are of a greater length than the width of the "C" clamps to accommodate adjustment and repositioning within the slots of the "C" clamps in securement of the seats.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal shield which has all the advantages of the prior art animal restraints and none of the disadvantages.

It is another object of the present invention to provide a new and improved animal shield which may be easily and efficiently manufactured and marketed.

It is a further object of the present invention to provide a new and improved animal shield which is of a durable and reliable construction.

An even further object of the present invention is to provide a new and improved animal shield which is susceptible of a low cost of manufacture with regard to both materials and labor, and which accordingly is then susceptible of low prices of sale to the consuming public, thereby making such animal shields economically available to the buying public.

Still yet another object of the present invention is to provide a new and improved animal shield which provides in the apparatuses and methods of the prior art some of the advantages thereof, while simultaneously overcoming some of the disadvantages normally associated therewith.

Still another object of the present invention is to provide a new and improved animal shield wherein the same includes a transparent flexible shield to enable visual observation of an animal's movements within a rear compartment of a seat and simultaneously allow the shield to be clamped to spaced bucket seats of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
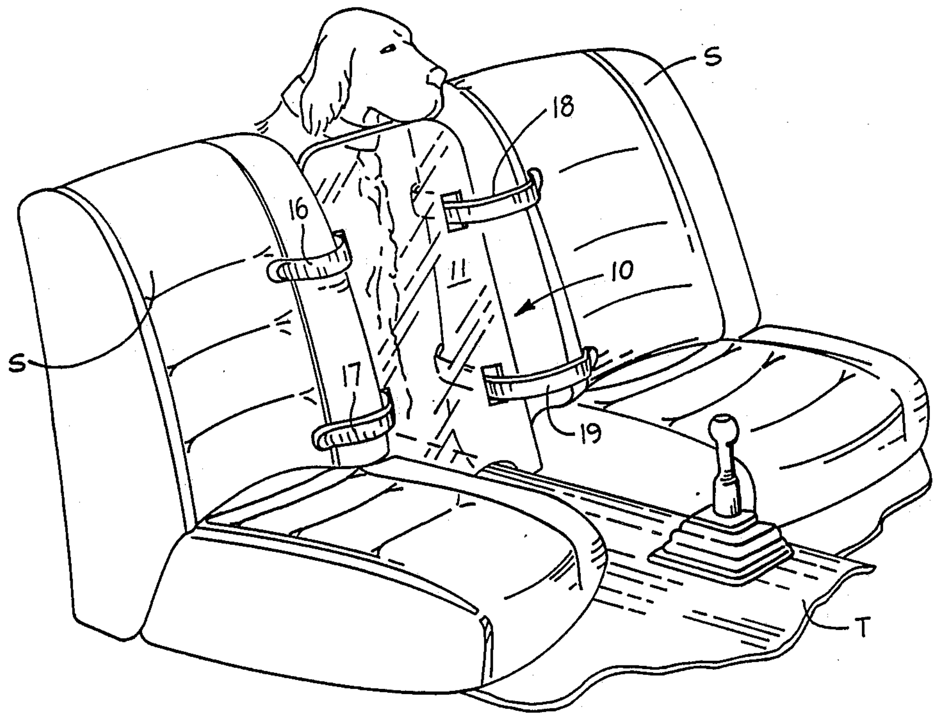
FIG. 1 is an isometric illustration of the instant invention secured to a pair of spaced and aligned bucket seats.
Figure 2:
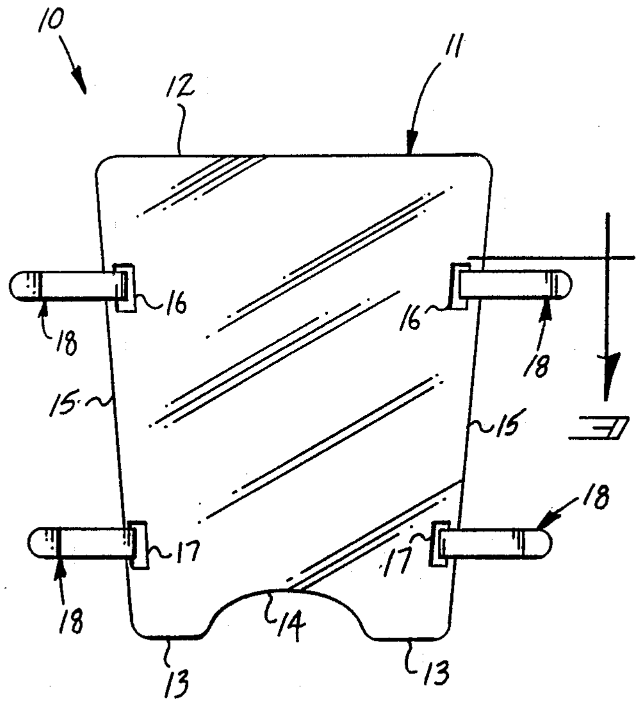
FIG. 2 is a forward orthographic view, taken in elevation, of the instant invention.
Figure 3:
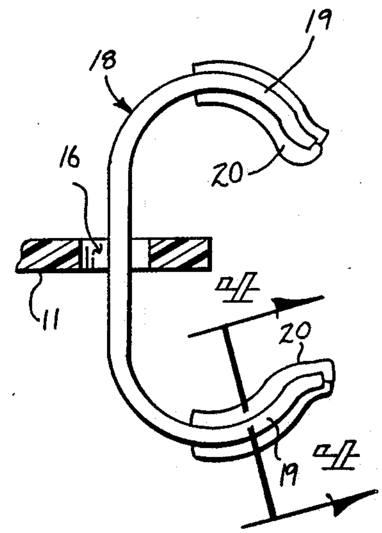
FIG. 3 is an orthographic view, taken on the section line 3 of FIG. 2, in the direction indicated by the arrows.
Figure 4:
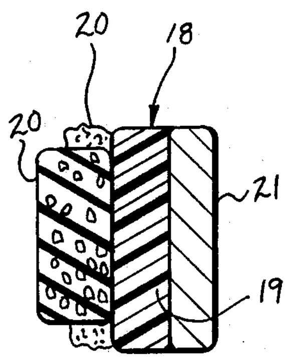
FIG. 4 is an orthographic view, taken along the lines 4—4 of FIG. 3, in the direction indicated by the arrows.

With reference now to the drawings, and in particular to FIGS. 1 to 4 thereof, a new and improved animal shield embodying the principles and concepts of the present invention and generally designated by the reference numeral 10 will be described.

More specifically, the animal shield 10 essentially comprises a transparent planar shield 11 formed of memory retentent polymeric material. The transparency enables visual observation of an animal retained within a rear compartment defined by the bridging of the animal shield 10 and its securement to the spaced and aligned bucket seats "S". The shield 11 includes an upper edge 12 overlying parallel spaced lower edges 13 with an arcuate recess 14 positioned medially of the lower edges 13. The recess 14 is configured to receive a transmission tunnel pump "T", as typically found in contemporary automotive construction. Shield 11 tapers downwardly from the upper edge 12 to the spaced lower edges 13 to accommodate the similar tapering of the spaced seats "S". Positioned adjacent the upper edge 12 and the sides 15 are a pair of spaced upper aligned slots 16 overlying a pair of lower aligned slots 17. The upper slots 16 are spaced apart a distance greater than that of the lower slots 17 consistent with the tapering of the shield 11. Each of the slots include a "C" shaped clamp 18 formed with spring biased legs 19 to securedly receive and clamp about a respective side of an adjacent seat "S". It should be understood that the slots 16 and 17 are each of a greater length than the width of the "C" shaped clamps 18 to enable the shield to orient itself between the seats "S" and enable adjustment of the clamps 18 in their securement about the adjacent seats "S". The spring biased legs 19 are each formed with interior padding 20 and exterior padding 21. The interior padding 20 is formed of a compressible foam-like material that is of a width less than that of the height of the associated clamp 18 whereupon compression of the inner padding 20 against the surface of an associated seat "S" deforms the interior padding to expand the entire width of the associated clamp 18, as is illustrated in phantom in FIG. 4. The exterior padding 21 is formed of a second or greater density padding of a thickness less than that of the interior padding 20 to afford comfort and safety when in contact with an individual seated within one of the seats "S".

The height of the shield is substantially that of the height of each of the seats "S" and is of a width substantially equal to the width spacing between the seats "S". It is understood that the shield "S" may be formed in various widths and height, but it is contemplated that the slots 16 and 17 will accommodate the greatest range and dimension of seats in enabling the clamps 18 to "travel" within the slots 16 and 17 to accommodate varying spacings and heights of associated bucket seats.

Figure 5:
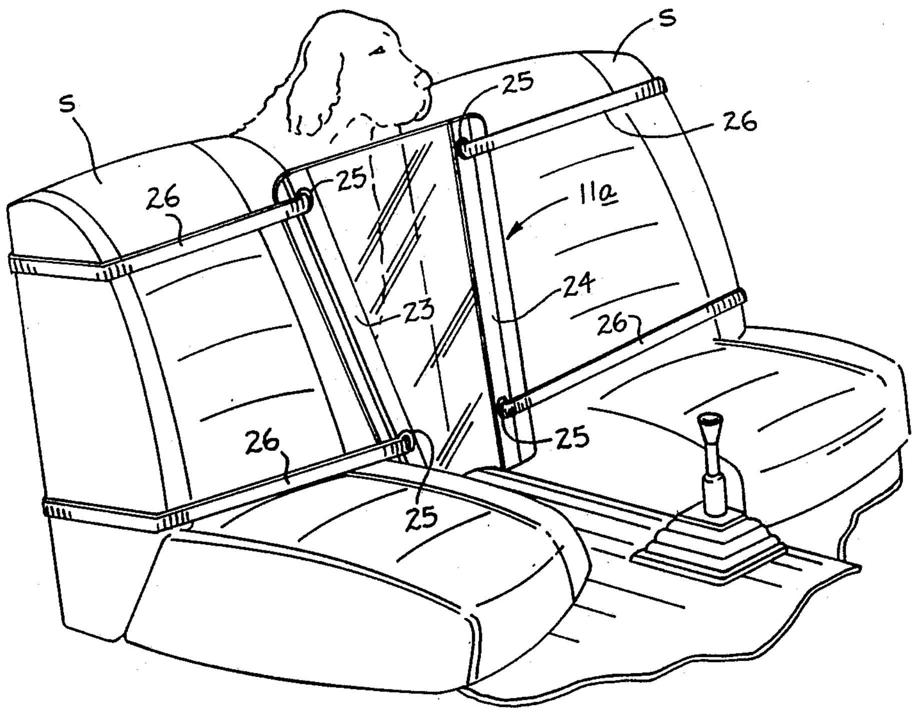
FIG. 5 is an isometric illustration of a modification of the instant invention.

Reference to FIG. 5 illustrates a modification of the instant invention wherein the modified shield 11*a* includes encircling metallic bands including a first metallic band 23 and a second metallic band 24 in an encircling and laminated relationship to the side edges of the shield 11*a*. The shield 11*a* is of a width greater than the spacing between the respective seats "S" to enable the bands 23 and 24 to be maintained in confronting engagement with the rear surfaces of the seats "S". The shield 11*a* further includes a plural pair of strap apertures 25 directed through the respective bands 23 and 24 at upper and lowermost portions of the bands orthogonally through the shield 11*a*. The apertures 25 enable the positioning of hook and loop fastener straps 26 to be directed therethrough and around adjacent seats "S" to secure and position the shield in relation to the seats "S". The bands 23 and 24 provide rigidity and structural integrity to the shield 11*a* to prevent the shield 11*a* from flexing and being forced between the spacing between the seats "S" upon impact by an animal or even a child or individual within the rear passenger compartment.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal shield to contain an animal within a rear passenger compartment of an automobile, said shield configured for securement to span a fixed distance between a plurality of seats within a forward passenger compartment of said automobile, said shield comprising, a solid planar flexible polymeric member formed of memory retentent material defined by an elongate upper edge spaced above a lower edge, said lower edge including an arcuate recess formed medially of said lower edge to accommodate a transmission tunnel therein, and further including clamp means for securement of said shield to confronting sides of the spaced seats, and wherein the clamp means includes a first pair of upper clamps aligned with one another, and spaced above a pair of lower clamps, said lower clamps defining a plurality of clamps aligned with one another, and wherein the upper clamps and lower clamps are oriented adjacent opposed sides of the shield, and wherein the upper clamps are slidably received within upper slots formed orthogonally through the shield, the upper slots are each aligned with one another and are spaced apart a first distance, and the upper slots are of a length greater than the width of the upper clamps to enable the upper clamps to be slidably positionable within the upper slots, and further including a pair of aligned lower slots slidably receiving the lower clamps respectively therewithin, the lower slots of a length greater than the lower clamps, and the lower slots spaced apart a second distance, and wherein the first distance is greater than the second distance, and wherein the opposed sides of the shield taper downwardly from the upper edge of the lower edge, and wherein each of the clamps is of a generally "C" shaped configuration, and the clamps further include spring biased opposed legs for securement of a respective seat within the legs, and wherein each of the legs includes an exterior padding and an interior padding, and wherein the interior padding is formed of compressible material and is of a width less than that of the leg of the "C" shaped clamp when the compressible, material is not subject to compressions and the exterior padding is of a greater density than the interior padding and is formed coextensively with the width of each leg of each "C" shaped clamp.

2. An animal shield as set forth in claim 1 wherein the shield further includes a first encircling metallic band and a second encircling metallic band laminated to and integrally secured adjacent side edges of the shield with each pair of strap apertures directed through a respective one of said bands.

* * * * *